United States Patent [19]

Olson

[11] 4,391,930

[45] Jul. 5, 1983

[54] STABILIZED SUSPENSION OF GLASS BUBBLES IN AN AQUEOUS DISPERSION OF TETRAFLUOROETHYLENE POLYMER

[75] Inventor: Allan H. Olson, Parkersburg, W. Va.

[73] Assignee: E. I. DuPont de Nemours & Co., Wilmington, Del.

[21] Appl. No.: 347,927

[22] Filed: Feb. 11, 1982

Related U.S. Application Data

[63] Continuation-in-part of Ser. No. 204,956, Nov. 7, 1980, abandoned.

[51] Int. Cl.$^3$ ............................................. C08J 9/32
[52] U.S. Cl. ................................... 523/219; 524/494; 524/546
[58] Field of Search ................. 523/219; 524/494, 546

[56] References Cited

U.S. PATENT DOCUMENTS 3,830,770 8/1974 Ribbans .............................. 260/29.6
3,928,703 12/1975 Cook ................................... 428/255

FOREIGN PATENT DOCUMENTS 2315259 10/1973 Fed. Rep. of Germany .

Primary Examiner—Joseph L. Schofer
Assistant Examiner—Bernard Lipman

[57] ABSTRACT

Hollow glass bubble-containing aqueous dispersions of tetrafluoroethylene polymer having good shelf life are provided, said dispersions also containing nonionic surfactant and water soluble electrolyte.

8 Claims, No Drawings

STABILIZED SUSPENSION OF GLASS BUBBLES IN AN AQUEOUS DISPERSION OF TETRAFLUOROETHYLENE POLYMER

CROSS-REFERENCE TO RELATED CASES

This application is a continuation-in-part of application Ser. No. 204,956, filed Nov. 7, 1980 now abandoned.

FIELD OF THE INVENTION

This invention relates to storage stable filler-containing aqueous dispersions of tetrafluoroethylene polymer and more particularly to such dispersions which contain glass bubbles.

BACKGROUND

Aqueous dispersions of tetrafluoroethylene polymers which contain glass beads or glass bubbles are known to be useful for coating onto glass fabric to provide a film thereon to protect and strengthen the glass fabric. The beads or bubbles aid in filling the fabric weave openings, and help provide protection to the fabric. Thus Cook U.S. Pat. No. 3,928,703 describes the use of glass beads or hollow glass bubbles in such dispersions for coating onto glass fabric.

The stability of the beads or bubbles in such a dispersion has long been of concern. German OS No. 2,315,259 describes the use of organic thixotropic thickeners to aid in keeping glass beads or bubbles in suspension; while Ribbans U.S. Pat. No. 3,380,770 describes the use of selected ionic electrolytes to aid in maintaining glass beads in suspension. Thickening is expected to retard the sinking or flotation of a filler with a density different from that of the medium in which the filler is dispersed. This is clear from Strokes" Law which describes the motion of a body under gravity, falling or rising as the case may be, and which specifically states that the limiting velocity should vary inversely with the viscosity of the medium. Nevertheless, thickening within a useful range of viscosity is not expected to prevent the sinking of a high density filler or the flotation of a low density filler. Thickened dispersions to the Ribbans patent exhibit settling of the filler during the normal commercial interval between production and use. The OS referred to above teaches that, even with thickening, the density of the glass bubbles should be approximately the same as that of the dispersion in which it is used. This would avoid the anticipated limit on the benefit of thickening by completely eliminating buoyancy, or the tendency to float. However, commercially available glass bubbles have very low density, approaching or even equaling the density of cork, and consequently are extremely buoyant.

It would be desirable to provide a dispersion containing glass bubbles which has both good stability with respect to flotation of the bubbles and a viscosity in a range to permit good coating onto fabric. Such a dispersion is provided by this invention.

SUMMARY OF THE INVENTION

The aqueous dispersions of this invention exhibit good shelf life with substantially no flotation or settling of glass bubbles in the dispersions. Specifically, the dispersions of this invention are described as a stabilized suspension of glass bubbles in an aqueous dispersion of tetrafluoroethylene polymer, which suspension comprises (a) water having dispersed therein 45–75% by weight, based on water, of a tetrafluoroethylene polymer having a melt viscosity of at least $1 \times 10^9$ poises at 380° C., (b) 5 to 10% by weight, based on polymer, of a nonionic surfactant, (c) 0.1 to 0.5% by weight, based on water and polymer, of a water-soluble electrolyte, and (d) 2 to 8% by weight, based on polymer, of glass bubbles having a density between 0.20 and 0.40, preferably between 0.23 and 0.40, g/ml and an average size between 20 and 130 microns, said dispersion having a viscosity between 135 and 300 cps at 25° C.

The dispersions are useful for application as a coating on fabric, especially glass fabric, as described in Cook U.S. Pat. No. 3,928,703.

DESCRIPTION OF THE INVENTION

The tetrafluoroethylene polymer employed herein is the nonmelt-fabricable class of tetrafluoroethylene polymer, as opposed to the lower melting, melt-fabricable class of tetrafluoroethylene polymer. The difference between these classes of tetrafluoroethylene polymers can be determined by melt viscosity. Nonmelt-fabricable polymers have high melt viscosities, e.g., $1 \times 10^9$ poise or more at 380° C.; while melt-fabricable polymers have much lower melt viscosities, e.g., on the order of $1 \times 10^4$ to $1 \times 10^6$. Melt viscosity of the polymer depends in large part upon the amount, if any, of comonomer present. Generally, the more comonomer present, the lower the melt viscosity. Melt viscosity also depends on the molecular weight of the comonomer. Thus nonmelt-fabricable tetrafluoroethylene polymers employed herein include polytetrafluoroethylene and copolymers of tetrafluoroethylene and different perfluorinated ethylenically unsaturated monomers present in an amount which does not cause the melt viscosity of the resultant copolymer to be below $1 \times 10^9$ poise at 380° C. One preferred class of ethylenically unsaturated monomers is perfluoro (alkyl vinyl ether) of 3–7 carbon atoms. Generally, the copolymer can contain up to between about 0.1–0.5% by weight of these comonomers before the melt viscosity falls below $1 \times 10^9$ poise. The maximum amount depends upon the molecular weight of the comonomer. For perfluro (propyl vinyl ether) the upper limit will be about 0.5%, this limit will be lower as the molecular weight of the ether increases. Another preferred class is perfluorinated α-olefins of 3–7 carbon atoms. Generally, the copolymer can contain up to between about 0.5–2.5% by weight of these comonomers before the melt viscosity falls below $1 \times 10^9$ poise. Again, the maximum amount depends on the molecular weight of the comonomer. For hexafluoropropylene the upper limit will be about 2.5%. This limit will be lower as the molecular weight of the olefin increases.

The tetrafluoroethylene polymers employed herein are prepared by the aqueous dispersion preparative method, rather than by the suspension polymerization method. In the aqueous dispersion method, a dispersion of the polymer is obtained by polymerization in an aqueous medium containing dispersing agent, such as from 0.2 to 0.8% by weight (based on water) ammonium polyfluorocarboxylate containing 7–10 carbon atoms, to form a dispersion of tetrafluoroethylene polymer particles in water. These particles are substantially round and have an average diameter generally within the range of 0.05 to 0.5 micron.

Polymer concentration is not critical, but generally ranges between 45 and 75% by weight based on weight of dispersion (polytetrafluoroethylene plus water plus nonionic surfactant). Preferred tetrafluoroethylene polymer concentration in the dispersion is 55 to 65% based on weight of dispersion.

If the polymer dispersion does not contain a solids content of over 45% by weight, the dispersion may be concentrated by evaporative techniques in order to place it in a form ready for addition of the other additives described herein.

The nonionic surfactant component of the dispersion is present in the dispersion in order to aid in maintaining the polymer in dispersed form and to aid the electrolyte in providing the beneficial effect of improved storage stability without causing coagulation. If the nonionic surfactant content is increased to 11% or more by weight, the sintered or fused product obtained from the dispersion may have a distinct brownish color. Thus, in order to minimize discoloration caused by the nonionic surfactant, a concentration below about 10%, and preferably of about 5% by wt is desired; as the tetrafluoroethylene polymer solids concentration in the dispersion is decreased from 60% by weight, greater amounts of the nonionic surfactant are required. Generally from 5 to 8% by weight of the surfactant will prevent coagulation when the electrolyte is added.

The nonionic surfactant component is any nonionic surfactant which is soluble in water at room temperature (20°–25° C.) at the concentration desired and can be composed of a single nonionic surfactant or a mixture of nonionic surfactants. Typically, the nonionic surfactants are prepared as reaction products of ethylene oxide, which imparts a hydrophilic moiety to the surfactant with other compounds which impart hydrophobic moieties to the surfactant, such as propylene oxide, amines, saturated and unsaturated aliphatic alcohols and aliphatic acids, and alkyl phenols. For purposes of illustration, some of the nonionic surfactants that can be used herein have the formulae:

$$R'[O(A)_nH]_x$$

wherein $(A)_n$ is the group $(C_2H_4O)_n$ or a mixture of the groups $(C_2H_4O)_a$ and $(C_3H_6O)_b$, wherein n in each instance is an integer of from 2 to 50 and preferably 2 to 18, b is an integer of 0 to 30, and a is an integer of at least 2, a+b being equal to n, x is an integer of 1, 2, or 3; and R' is a hydrocarbon group.

A preferred surfactant has the formula:

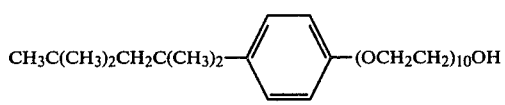

Other useful surfactants are described in U.S. Pat. No. 3,830,770.

The electrolyte used herein aids in increasing shelf-life of the dispersions by thickening the dispersion. Examples of electrolyte are any of the water-soluble organic and inorganic acids, bases, and salts. Of the organic compounds, those acids and salts, of the formula RCOOY wherein R is a saturated or unsaturated hydrocarbon radical and Y is H, $NH_4$ or metal, are exemplary. Of the inorganic compounds, examples are HCl, $H_2SO_4$ and bases and salts of metals or ammonium, examples of the anionic moiety of the salt being nitrate, sulphate, sulphite, carbonate, and halide. Examples of the metal moiety in the above-mentioned organic carboxylates and inorganic bases and salts are lithium, sodium, potassium, copper, barium, manganese, magnesium, calcium, zinc, aluminum, and lead. Preferably, the electrolyte does not discolor sintered or fused products obtained from the dispersion to the extent caused by nonionic surfactant in concentrations imparting equivalent storage stability to the filler-containing dispersion, and more preferably, the electrolyte yields a white or colorless residue when heated at temperatures of 340° C. for 5 minutes.

The electrolyte can be added to the dispersion either as an aqueous solution or as dry solid which dissolves in the dispersion. The storage stability of the filler-containing aqueous dispersion of tetrafluoroethylene polymer increases with increasing amount of electrolyte added to the dispersion. Preferably the amount of the electrolyte present will be between 0.1 and 0.3% by weight. Representative electrolytes include:

| | |
|---|---|
| Aluminum Nitrate | Magnesium Nitrate |
| Aluminum Sulfate | Potassium Nitrate |
| Ammonium Carbonate | Potassium Sulfate |
| Ammonium Citrate | Sodium Citrate |
| Ammonium Nitrate | Sodium Borate |
| Ammonium Sulfate | Sodium Meta Silicate |
| Barium Nitrate | Sodium Ortho Silicate |
| Magnesium Citrate | |

The glass bubbles may range in density between about 0.20 and 0.40 g/ml, most preferably between 0.36 and 0.39 g/ml; and in size, from an average of 20 to 130 micron as determined by "microtrac" particle size analyser. By "bubble" is meant that the glass is hollow. The bubble shape is spherical. The amount present in the dispersion will be between 2 and 8%. The bubbles may be treated, if desired, to improve coupling between the bubbles and the tetrafluoroethylene polymer. Useful coupling agents include 3-aminopropyltriethoxy silane, methyltrimethoxysilane, N-trimethoxysilylpropyl-N,N,N, trimethyl ammonium chloride, octadecyldimethyl [3-(trimethoxysilyl) propyl] ammonium chloride, methacryloxyethyldimethyl [3-trimethoxysilylpropyl] ammonium chloride, and polymethylhydrosiloxane. The bubbles were treated for 2 hours at 25° C. with a 1% (hydrolyzed) aqueous solution of silane, followed by drying the glass for 3 hours at 100° C. prior to use in formulation.

Ordinarily the aqueous dispersion containing polymer and nonionic surfactact as polymerized is adjusted to proper solids content, then electrolyte and glass bubbles are added sequentially. Care should be taken that the viscosity of the resulting dispersion is between about 130–300, cps at 25° C., for below 130 cps, flotation of the hollow glass beads occurs.

Dispersions containing the foregoing materials and prepared as described above, exhibit good viscosity stability and storage stability with very little tendency for settling or flotation with time of the glass bubbles. The dispersions may also contain pigments, drying retardants and/or leveling agents. Pigments can include titanium dioxide, usually added in a slurry. A preferred drying retardant is ethylene glycol; others incude glycerol, propylene glycol, diethylene glycol and the like.

The dispersions of the present invention are useful for coating woven fabrics, especially woven glass fabrics. Such fabrics generally have apertures between the yarn of the fabric. The glass bubbles in the dispersions of the present invention helps fill up these apertures with coating material with fewer recoating steps than if the bubbles were omitted. The resultant glass fabric with a continuous coating of residue of dispersion of the present invention after drying and sintering of the PTFE is especially useful in architectural applications such as for inflatable roofing. In such applications, the glass bubbles, because of their translucency and colorless nature, cause the resultant coated glass fabric to be translucent.

The following Examples are intended as being illustrative of the present invention and not as a limitation on the scope thereof (parts and percents are by weight unless otherwise indicated).

Description of Tests

Aqueous dispersion viscosity in centipoise at 25° C. was determined using a "Brookfield" Synchro-Lectric Viscometer Model LVT at 60 rpm and #2 spindle.

Dispersion % solids and % "Triton" (based on solids) were determined gravimetrically by weight differences on drying at 100° C. and sintering at 380° C.

Melt viscosities of the tetrafluoroethylene polymers can be determined, if desired, by coagulating the as polymerized aqueous dispersion.

Melt viscosities of the tetrafluoroethylene polymers are calculated by measuring the tensile creep of a sintered piece held at 380° C. Specifically, 12 g of molding powder is placed in a 7.6 cm diameter mold between 0.152 cm rubber cauls and paper spacers. The mold is then heated at 100° C. for 1 hour. Pressure is then slowly applied on the mold until a vlaue of 140.6 kg/cm² is obtained. This pressure is held for 5 minutes and then released slowly. After the sample disc is removed from the mold and separated from the cauls and paper spacers, it is sintered at 380° C. for 30 minutes. The oven is then cooled to 290° C. at a rate of about 1° C. a minute and the sample is removed. A crack-free rectangular sliver with the following dimensions is cut: 0.152 to 0.165 cm wide, 0.152 to 0.165 cm thick, and at least 6 cm long. The dimensions are measured accurately and the cross-sectional area is calculated. The sample sliver is attached at each end to quartz rods by wrapping with silver-coated copper wire. The distance between wrappings is 4.0 cm. This quartz rod-sample assembly is placed in a columnar oven where the 4 cm test length is brought to a temperature of 380°±2° C. A weight is then attached to the bottom quartz rod to give a total weight suspended from the sample sliver of about 4 g. The elongation measurements vs. time are obtained and the best average value for the creep rate in the interval between 30 and 60 minutes is measured. The specific melt viscosity, which may be better called apparent melt viscosity, is then calculated from the relationship $$app = (WL_t g)/3(dL_t/dt)A_t$$

where app = (apparent) melt viscosity in shear, poises
W = tensile load on sample, g
$L_t$ = length of sample (at 380° C.) cms (4.32 cm)
g = gravitational constant, 980 cm/sec²
$(dL_t/dt)$ = rate of elongation of sample under load = slope of elongation vs. time plot, cm/sec
$A_t$ = cross-sectional area of sample (at 380° C.), cm² (area increases 37% at 380° C. over that at room temperature).

Viscosities of aqueous dispersions described herein are measured using a Brookfield viscometer (model LVT) operating at 60 r.p.m. at 25° C. using a #2 spindle. The spindle is lowered into the dispersion, and the viscometer is turned on and allowed to equilibrate for one minute before a reading is taken. Readings were taken in triplicate and averaged. The averaged value was multiplied by 5 to obtain the viscosity in centipoise (cps).

Description of Materials

PTFE Dispersion—Aqueous dispersion of polytetrafluoroethylene having a melt viscosity of about $1 \times 10^9$ poises at 380° C., neutralized with ammonium hydroxide and stabilized with "Triton" X-100.

"Triton" X-100—Octaphenoxypolyethyleneoxide (10-PEO Units Avg.) nonionic surfactant.

Electrolyte Salts—Reagent grade unless specified otherwise.

Glass Bubbles—Type used was:

| Type | Size D$_{50}$ | Density g/ml |
|------|---------------|--------------|
| A    | 50            | 0.38 g/ml    |

EXAMPLES

General Formulation Procedure

Polytetrafluoroethylene dispersion (% solids/% "Triton") is charged to a suitable vessel (beaker or pail) equipped with a mechanically driven propeller-type stirring blade run at a speed sufficient to agitate the ingredients but not introduce air or foam in the mixture. Formulations are normally prepared at ambient laboratory temperature (20°-25° C.). Either water, "Triton" X-100, or ethylene glycol may then be added to the stirred dispersion to obtain the desired ratio of ingredients (% solids/% "Triton"/glycol).

Soluble electrolyte is then added either in a single addition or in incremental additions to the stirred mixture to increase the viscosity of the formulation. Stirring is continued 5–10 minutes after the addition of electrolyte to allow solution to take place before viscosity determinations are made. Once the desired starting viscosity has been obtained, the charge of glass bubbles is gradually added to the stirred formulation. The mixture is agitated for an additional 30 minutes after the completion of filler addition before viscosity measurements are made.

EXAMPLE 1

To a stirred dispersion of polytetrafluoroethylene (PTFE) homopolymer (500 g) containing 60.0% solids and 6.0% "Triton" X-100 nonionic surfactant was added 1.2 g barium nitrate electrolyte (0.24%) based on water and polymer to obtain a dispersion viscosity of 170 centipoise at 25° C. after mixing for 10 minutes. Hollow glass bubbles (13 g, of Type "A") were added gradually with agitation to the thickened dispersion giving a homogeneous mixture after 30 minutes of agitation with a final viscosity of 190 centipoise at 25° C. Glass bubble content was 2.5% based on water and polymer.

The formulation was allowed to stand in a closed container undisturbed for four days and then analyzed for glass bubble distribution by a gravimetric procedure employing evaporation and removal of resin and surfactant by baking 20 minutes at 680° C. The amount of glass bubbles found was 2.2% near the surface, 2.4% near the bottom and 2.45% in the sample after remixing, thus indicating good stability.

EXAMPLE 2

To a stirred PTFE homopolymer dispersion (1000 g) containing 60.2% solids and 6.4% "Triton" X-100 were added in order, ethylene glycol (30 g), and barium nitrate (5.0 g). After stirring for 10 minutes the mixture had a viscosity of 163 centipoise at 25° C. Glass bubbles (26 g of Type "A") were added gradually with agitation to the dispersion to afford a homogeneous mixture after stirring 30 minutes with a final viscosity of 182 centipoise at 25° C. After standing 11 days in a closed container, the distribution of glasss bubbles, as determined in Example 1, was found to be: 2.3% near the surface, 2.9% near the bottom and after remixing 2.50%, thus indicating good stability.

EXAMPLE 3

To a stirred PTFE dispersion (1000 g) containing 60.2% solids and 6.4% "Triton" X-100 was added barium nitrate (2.4 g) to obtain, after 10 minutes of mixing, a dispersion viscosity of 167 centipoise at 25° C. Glass bubbles (26 g of Type "A") were added as in Example 2, to give a homogeneous mixture with a viscosity of 192 centipoise at 25° C. The mixture was again agitated while $TiO_2$ pigment slurry (6.5 g 67.5% solids—described below) was introduced and stirring continued for an additional 30 minutes. The final formulation viscosity was 192 centipoise at 25° C. After standing undisturbed for 12 days in a closed container, the glass bubble distribution in the formulation was found to be: 2.4% near the surface, 2.40% near the bottom, and after remixing 2.58%, thus indicating good stability. $TiO_2$ slurry was prepared by:

To stirred demineralized water (600 g) was added sodium citrate dihydrate (2.8 g, $Na_3C_6H_5O_7.2H_2O$) dispersing agent, followed by the gradual addition of $TiO_2$ (1400 g). On completion of the $TiO_2$ addition, "Triton" X-100 (70 g) was added with stirring to stabilize the slurry. The resultant mixture contains 67.5% $TiO_2$ and remained in useful slurry form for several months.

EXAMPLE 4

To a stirred PTFE dispersion (1000 g) containing 60.2% solids, and 6.4% "Triton" X-100 was added in order, ethylene glycol (30 g) and barium nitrate (5.0 g). After stirring for 10 minutes the mixture had a viscosity of 167 centipoise at 25° C. As in Example 3, glass bubbles (26 g of Type "A") were added to give a viscosity of 192 centipoise at 25° C., followed by $TiO_2$ pigment slurry (6.5 g slurry 67.5% $TiO_2$) to give a final formulation viscosity of 192 centipoise at 25° C. After standing undisturbed for 12 days in a closed container, the glass bubble distribution in the formulation was found to be: 2.6% near the surface, 2.8% near the bottom, and after remixing 2.9%, thus indicating good stability.

EXAMPLE 5

Using the procedure in Example 1, a formulation was prepared from PTFE dispersion (10 kg, 60.2% solids and 6.0% "Triton" X-100), barium nitrate (20 g to give an initial viscosity of 148 cps at 25° C.), and glass bubble (253 g of Type "A") filler to afford a final formulation viscosity of 172 centipoise at 25° C. A sample (1 kg) of this formulation was allowed to stand undisturbed for two months in a closed container during which time a layer of clear supernate liquid (1.5 cm in depth) formed over the dispersion (10 cm in depth). The distribution of glass bubbles in the dispersion phase was found to be 2.4% near the surface and 2.5% near the bottom.

EXAMPLE 6

A. Glass Bubble Surface Treatment

Glass bubbles (100 g of Type "A") were slurried for two hours at 25° C. in a previously prepared solution of 3-aminopropyltriethoxysilane (5 g) in $H_2O$ (500 ml). The bubbles were removed from the slurry by filtering and dried at 100° C. for three hours.

The above procedure was repeated on Type "A" (100 g) glass bubbles using the following silanes:
Methyltrimethoxysilane (5 g/500 ml $H_2O$ used)
N-Trimethoxysilylpropyl-N,N,N—Trimethyl ammonium Chloride (supplied as 50% solution in methanol—10 g/500 ml $H_2O$ used)
Octadecyldimethyl [3-(Trimethoxysilyl) propyl] Ammonium Chloride (supplied as 50% solution in methanol—10 g/500 ml $H_2O$ used)
Methacryloxyethyldimethyl [3-Trimethoxysilylpropyl] Ammonium Chloride (supplied as 50% solution in diacetone alcohol—10 g/500 g $H_2O$ used)

Glass bubbles (100 g of Type "A") were also slurry treated with a solution of polymethylhydrosiloxane (5 g/500 ml) in acetone for 2 hours at 25° C. The bubbles were filtered from the slurry and dried 16 hours at 120° C.

B. Treated Bubble Filled Formulations

Dispersion of viscosity 158 centipoise at 25° C. was prepared by adding barium nitrate (6.6 g) to an agitated PTFE dispersion (3100 g) containing 60.2% solids and 6.0% "Triton" X-100.

Portions of the above dispersion (500 g) were combined by agitation giving homogeneous formulations with the previously surface treated glass bubbles (13.0 g) in Part A as shown below:

| | | | Viscosity cps @ 25° C. | |
|---|---|---|---|---|
| Sample | Starting Viscosity @ 25° C. | Treated Glass Bubbles (13 g) | After Bubble Addition | After One Month |
| 6-A | 158 cps | 3-Aminopropyltri-ethoxysilane | 178 | 173 |
| 6-B | " | Methyltrimethoxy-silane | 183 | 176 |
| 6-C | " | N—Trimethoxysilyl-prpyl-N,N,N, Tri-methyl Ammonium Chloride | 181 | 177 |
| 6-D | " | Octadecyldimethyl-[3-(Trimethoxy-silyl) propyl] Ammonium Chloride | 185 | 182 |
| 6-E | " | Methacryloxyethyl-dimethyl [3-Tri-methoxysilylpropyl] Ammonium Chloride | 182 | 183 |
| 6-F | " | Polymethylhydro- | 184 | 182 |

-continued

| Sample | Starting Viscosity @ 25° C. | Treated Glass Bubbles (13 g) | Viscosity cps @ 25° C. After Bubble Addition | After One Month |
|---|---|---|---|---|
| | | siloxane | | |

These results show that viscosity changes very little over the one month period. In addition, the glass bubbles remained substantially dispersed.

EXAMPLE 7

A formulation with a viscosity of 158 centipoise at 25° C., was prepared by adding barium nitrate (6.8 g, Ba(NO$_3$)$_2$) to PTFE dispersion (3100 g) of 60.2% solids and 6.0% "Triton" X-100 and stirring for approximately 30 minutes. To portions of the dispersion were added Type "A" glass bubbles, in the amounts shown in the table below, to afford a homogeneous, filled, formulation as in Example 1.

| Example Number | Amount-Grams of 158 Centipoise Starting Disper. | Amount-Grams of Glass Bubbles | % Glass of Total Solids | Viscosity cps @ 25° C. Time After Glass Bubble Addn. | | |
|---|---|---|---|---|---|---|
| | | | | 30 min. | 5 Days | 25 Days |
| 7A | 500 g | 9.3 | 3 | 177 | 177 | 176 |
| 7B | 500 g | 12.5 | 4 | 182 | 183 | 181 |
| 7C | 500 g | 15.8 | 5 | 187 | 186 | 188 |
| 7D | 500 g | 19.1 | 6 | 192 | 193 | 195 |
| 7E | 500 g | 22.6 | 7 | 197 | 200 | 200 |
| 7F | 500 g | 26.1 | 8 | 207 | 207 | 206 |

EXAMPLE 8

Portions of barium nitrate were added in the amounts shown in the table below to stirred samples of PTFE dispersion containing 60.2% solids and 6.0% "Triton" (based on solids). After mixing the samples 10 minutes, the viscosities were determined to be in the range shown. Type "A" glass bubbles were added with agitation to the dispersions to afford homogeneous formulations with the range of final viscosities shown.

Formulations with viscosities of 135 centipoise at 25° C. or above showed little to no tendency for glass bubbles to float in undisturbed samples in over 3 months of shelf stability testing. In samples with viscosities of 74 and 100 centipoise, glass bubble floatation in the formulation occurred within 9 days from the time of preparation.

| Example Number | Starting Dispersion 60.2% Solids 6.0% "Triton" Grams | Barium Nitrate Grams | Viscosity cps @ 25° C. | Glass Bubbles Grams | Final Viscosity cps at 25° C. | Results |
|---|---|---|---|---|---|---|
| (comparison) | 1000 | 1.20 | 50 | 26 | 74 | Flotation |
| (comparison) | 1000 | 1.40 | 75 | 26 | 100 | Flotation |
| 8A | 1000 | 1.62 | 107 | 26 | 135 | No Flotation |
| 8B | 1000 | 1.73 | 117 | 26 | 145 | No Flotation |
| 8C | 1000 | 1.85 | 132 | 26 | 158 | No Flotation |
| 8D | 1000 | 1.96 | 137 | 26 | 168 | No Flotation |
| 8E | 1000 | 2.08 | 145 | 26 | 177 | No Flotation |
| 8F | 1000 | 2.19 | 153 | 26 | 180 | No Flotation |

EXAMPLE 9

To the amount of stirred PTFE dispersion shown in the table below, were added either water, ethylene glycol, and "Triton" X-100 to obtain the dispersion composition shown. Ammonium citrate (dibasic) was added and the mixtures stirred approximately 10 minutes before viscosity determinations were made. Type "A" glass bubbles were added with agitation as in Example 1 to afford homogeneous mixtures with final viscosities as shown. In Example 9, TiO$_2$ slurry was added as in Example 3 following the glass bubble addition. Stability of the dispersions with respect to flotation of the glass bubbles was excellent.

EXAMPLE 9

| Formulation Number | Grams Starting Dispersion 60.2% Solids 6.0% "Triton" | Grams H2O | Grams Ethylene Glycol | Grams "Triton" X-100 | Adjusted Dispersion Comp. | | |
|---|---|---|---|---|---|---|---|
| | | | | | % Solids | %[1] Triton | %[2] Glycol |
| 9A | 465 | 35 | — | — | 56 | 6.0 | — |
| 9B | 465 | 32 | — | 2.8 | 56 | 7.0 | — |
| 9C | 465 | — | 35 | — | 56 | 6.0 | 16 |
| 9D | 465 | — | 32 | 2.8 | 56 | 7.0 | 16 |
| 9E | 465 | 35 | — | — | 56 | 6.0 | — |

| Formulation Number | Grams Ammonium Citrate Thickener | Viscosity cps 25° C. After Ammonium Citrate Add | Grams Glass Bubbles "A" | Viscosity cps @ 25° C. After Bubble Addition | Grams TiO2 Slurry 67.5% | Final Formulation Viscosity cps @ 25° C. |
|---|---|---|---|---|---|---|
| 9A | 1.5 | 136 | 13 | 153 | — | 153 |
| 9B | 0.9 | 147 | 13 | 169 | — | 169 |
| 9C | 1.5 | 145 | 13 | 162 | — | 162 |
| 9D | 0.8 | 173 | 13 | 210 | — | 210 |

| | | -continued | | | | |
|---|---|---|---|---|---|---|
| 9E | 1.5 | 141 | 13 | 155 | 3.0 | 158 |

[1] % based on PTFE solids
[2] % of liquid phase

EXAMPLE 10

Four aqueous dispersions of polytetrafluoroethylene were prepared according to the following formulations:

| | Dispersion | | | |
|---|---|---|---|---|
| Ingredient (%) | I | II | III | IV |
| PTFE | 60.2 | 60.2 | 60.2 | 60.2 |
| Surfactant | 6.0 | 6.0 | 6.0 | 6.0 |
| Barium Nitrate a water-soluble electrolyte | 0.175 | 0.175 | 0.175 | 0.175 |
| Glass bubbles | 5 | 8 | 11 | 15 |

The surfactant was "TRITON"X-100 (an ethoxylated alkyl phenol). The bubbles had a density of 0.38 g/m and an average size of 50 micron. The dispersions had viscosities of 185, 205, 217 and 200 cps, respectively, at 25° C.

The dispersions were used to coat separate woven glass fibers (of plain weave and of 18×19 count (warp and fill) per inch and of 18 oz/sq. yd weight) until the weight of coating on the fabric was about 43–45 oz per square yard. Each fabric was folded back on itself to form a sharp crease and cracks forming were visually observed.

The following results were observed.

| | Dispersion | | | |
|---|---|---|---|---|
| Ingredient (%) | I | II | III | IV |
| Crease Cracking | None | None | a number of cracks were observed | Many cracks were observed |

I claim:

1. A stabilized suspension of glass bubbles in an aqueous dispersion of tetrafluoroethylene polymer, which suspension comprises
  (a) water having dispersed therein 45–75% by weight, based on water, of a tetrafluoroethylene polymer having a melt viscosity of at least $1 \times 10^9$ poises at 380° C.,
  (b) 5 to 10% by weight, based on polymer, of a nonionic surfactant,
  (c) 0.1 to 0.5% by weight, based on water and polymer, of a water-soluble electrolyte, and
  (d) 2 to 8% by weight, based on polymer, of glass bubbles having a density between 0.20 and 0.40 g/ml and an average size between 20 and 130 micron,
  said dispersion having a viscosity between 135 and 300 cps at 25° C.

2. The dispersion of claim 1 wherein the polymer concentration is 55 to 65% by wt.

3. The dispersion of claim 1 wherein the polymer is polytetrafluoroethylene.

4. The dispersion of claim 1 wherein the surfactant concentration is from 5.0 to 8.0% by weight.

5. The dispersion of claim 1 wherein said electrolyte is an inorganic barium salt.

6. The dispersion of claim 1 wherein said electrolyte is an ammonium citrate.

7. The dispersion of claim 1 wherein the nonionic surfactant is an ethoxylated aliphatic alcohol or ethoxylated alkyl phenol.

8. The dispersion of claim 1, 2, 3, 4, 5, 6 or 7 wherein the glass bubbles have a density of between about 0.36 and 0.39 g/ml.

* * * * *